(12) United States Patent
Kobayashi (10) Patent No.: US 10,963,200 B2
(45) Date of Patent: Mar. 30, 2021

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Hiroaki Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/283,236

(22) Filed: Feb. 22, 2019

(65) Prior Publication Data
US 2019/0265918 A1     Aug. 29, 2019

(30) Foreign Application Priority Data
Feb. 23, 2018  (JP) .............................. JP2018-031227

(51) Int. Cl.
*G06F 3/12* (2006.01)
*H04N 1/44* (2006.01)

(52) U.S. Cl.
CPC ............ *G06F 3/126* (2013.01); *G06F 3/1203* (2013.01); *G06F 3/1207* (2013.01); *G06F 3/1238* (2013.01); *G06F 3/1239* (2013.01); *H04N 1/4413* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0128383 A1* | 7/2003 | Teranoshita | ....... | H04N 1/00188 358/1.15 |
| 2007/0172281 A1* | 7/2007 | Inoue | .................... | G06F 3/1255 400/62 |
| 2008/0170261 A1* | 7/2008 | Mizutani | .............. | B41J 2/17546 358/1.15 |
| 2009/0207439 A1* | 8/2009 | Oomura | ................ | G06F 3/1288 358/1.15 |
| 2015/0172267 A1* | 6/2015 | Sato | ........................ | H04L 63/08 726/3 |
| 2018/0069978 A1* | 3/2018 | Iwabuchi | .............. | G06F 3/1267 |

FOREIGN PATENT DOCUMENTS

JP      2010-108104 A      5/2010

\* cited by examiner

*Primary Examiner* — Ibrahim Siddo
(74) *Attorney, Agent, or Firm* — Canon U.S.A., Inc., IP Division (57) ABSTRACT

An information processing apparatus is provided and includes a transmission unit configured to transmit a print job to a transmission destination. The information processing apparatus includes a receiving unit configured to receive a print time, a generation unit configured to generate a print job including print time data based on the print time received by the receiving unit, and an acquisition unit configured to acquire, from an external device which is the transmission destination, setting information about whether a function restriction setting that prohibits use of a print function of the external device is valid or invalid. Based on an indication that the function restriction setting in the setting information acquired by the acquisition unit is valid, the generation unit is unable to generate a print job including the print time data.

5 Claims, 12 Drawing Sheets

PRINT DRIVER PROPERTY

| | | |
|---|---|---|
| OUTPUT METHOD | RESERVATION PRINTING ▽ | 701 |
| | NORMAL PRINTING | |
| OUTPUT TIME | 15 : 30 | 702 |
| NUMBER OF COPIES | 5 COPIES | 703 |
| SHEET SIZE | A4 ▽ | 704 |
| COLOR/MONOCHROME | COLOR ▽ | 705 |
| AGGREGATION | 2 in 1 ▽ | 706 |
| ONE-SIDED/TWO-SIDED | ONE-SIDED ▽ | 707 |
| USER NAME | USER A | START PRINTING | CANCEL |

PRINT DRIVER PROPERTY

| | | |
|---|---|---|
| OUTPUT METHOD | NORMAL PRINTING ▽ | 712 |
| NUMBER OF COPIES | 5 COPIES | 703 |
| SHEET SIZE | A4 ▽ | 704 |
| COLOR/MONOCHROME | COLOR ▽ | 705 |
| AGGREGATION | 2 in 1 ▽ | 706 |
| ONE-SIDED/TWO-SIDED | ONE-SIDED ▽ | 707 |
| USER NAME | USER A | START PRINTING | CANCEL |

INFORMATION PROCESSING APPARATUS, CONTROL METHOD FOR INFORMATION PROCESSING APPARATUS, AND STORAGE MEDIUM

BACKGROUND

Field

The present disclosure relates to an information processing apparatus, a control method for the information processing apparatus, and a storage medium.

Description of the Related Art

An information processing apparatus (e.g., a personal computer (PC)) can transmit a print job to an image forming apparatus (e.g., a multifunctional peripheral (MFP)). The print job transmitted from the information processing apparatus is received by the image forming apparatus, and execution of the received print job is managed based on a setting (a function restriction setting) for prohibiting the use of each function of the image forming apparatus. Specifically, a print function may be restricted in the image forming apparatus. In such a case, a print job is not executed even if the information processing apparatus transmits the print job to the image forming apparatus.

Moreover, the information processing apparatus can transmit to the image forming apparatus a reserved print job in which a time at which printing is to be performed is set. The image forming apparatus receives the reserved print job, and then starts printing at a set time (hereinafter referred to as a reserved time).

For example, if one user outputs a large amount of print jobs in the daytime during which the image forming apparatus is frequently used, other users may not be able to perform printing. Accordingly, print jobs may be intended to be executed in a time period such as the middle of night during which the image forming apparatus is less frequently used. In such a case, reserved print jobs are used in such a time period that is set as a reserved time.

Japanese Patent Application Laid-Open No. 2010-108104 discusses the following configuration. A print server receives a reserved print job, holds the reserved print job, and then transmits the reserved print job to an image forming apparatus at a reserved time. Upon receipt of the reserved print job, the image forming apparatus executes the print job to output printed products.

When a reserved print job is transmitted from the information processing apparatus, the image forming apparatus holds the reserved print job, which has been received. However, if a function restriction setting of the image forming apparatus is valid, the function restriction setting may cause the reserved print job held by the image forming apparatus not to be executed.

SUMMARY OF THE INVENTION

The present disclosure is directed to providing a configuration by which a reserved print job is not transmitted from an information processing apparatus if a function restriction setting is set in an image forming apparatus.

According to an aspect of the present disclosure, an information processing apparatus is provided and includes a transmission unit configured to transmit a print job to a transmission destination. The information processing apparatus includes a receiving unit configured to receive a print time, a generation unit configured to generate a print job including print time data based on the print time received by the receiving unit, and an acquisition unit configured to acquire, from an external device which the transmission destination, setting information about whether a function restriction setting that prohibits use of a print function of the external device is valid or invalid. Based on an indication that the function restriction setting in the setting information acquired by the acquisition unit is valid, the generation unit is unable to generate a print job including the print time data.

Further features will become apparent from the following description of exemplary embodiments with reference to the attached drawings.

DESCRIPTION OF THE EMBODIMENTS

Each of exemplary embodiments is described in detail with reference to the drawings. The following exemplary embodiments are not intended to limit the scope of the claims, and not all of the combinations of the aspects that are described in the following embodiments are necessarily required as part of the solution.

Figure 1:
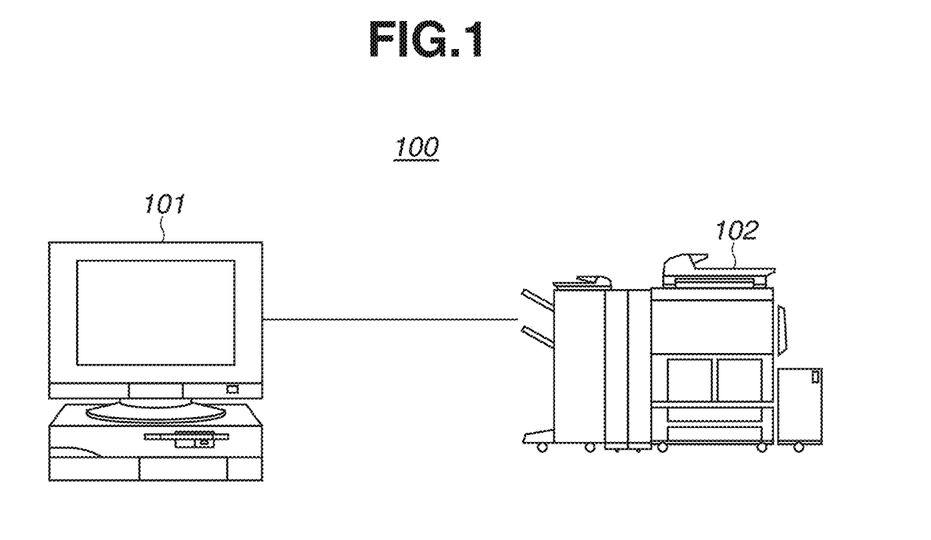
FIG. 1 is a diagram illustrating one example of a system configuration of an image forming system.

FIG. 1 is a block diagram illustrating one example of a system configuration of an image forming system 100 according to a first exemplary embodiment. The image forming system 100 in FIG. 1 includes an image forming apparatus 102 and an information processing apparatus 101. The information processing apparatus 101 and the image forming apparatus 102 are communicably connected. In the present exemplary embodiment, the information processing apparatus 101 and the image forming apparatus 102 are connected via a network. However, the information processing apparatus 101 and the image forming apparatus 102 can be connected via a cable such as a parallel cable, a serial cable, or a universal serial bus (USB) cable.

The information processing apparatus 101 acquires setting information about each function of the image forming apparatus 102. Moreover, the information processing apparatus 101 can generate page description language (PDL) data and a print setting, and can transmit the generated PDL data and the generated print setting to the image forming apparatus 102 as a print job or a reserved print job.

The image forming apparatus 102 manages the PDL data and the print setting received from the information processing apparatus 101, as a print job or a reserved print job. The image forming apparatus 102 executes the print job or the reserved print job to perform printing.

Figure 2:
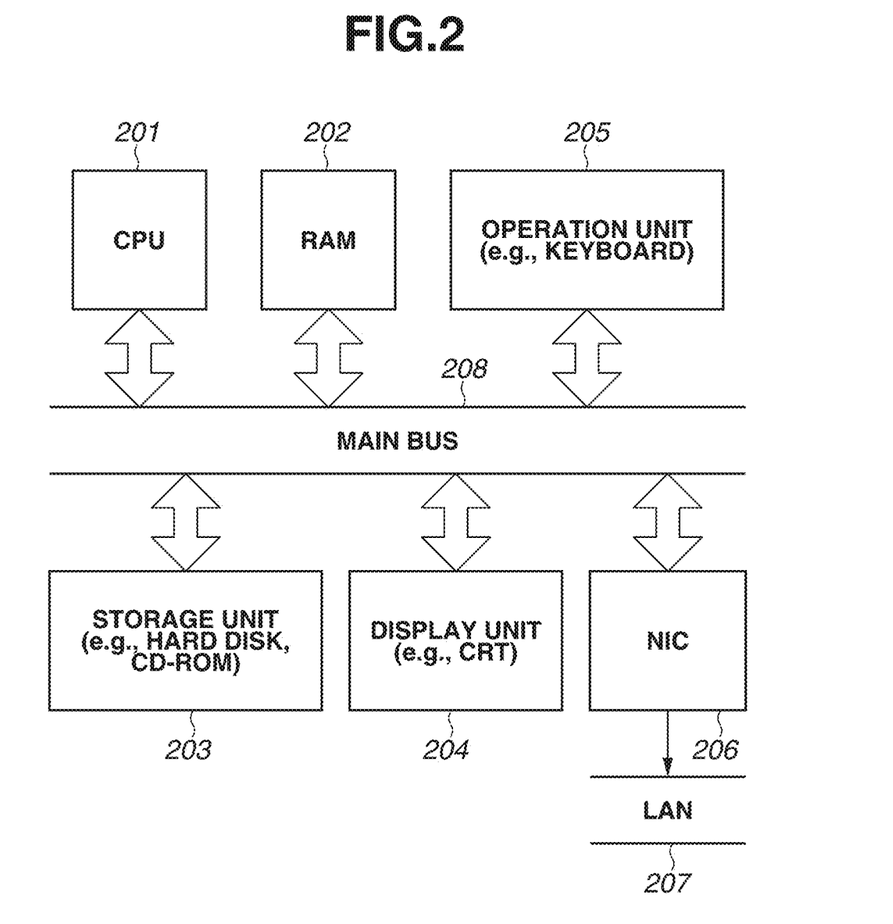
FIG. 2 is a diagram illustrating one example of a hardware configuration of an information processing apparatus.

FIG. 2 is a diagram illustrating one example of a hardware configuration of the information processing apparatus 101.

A central processing unit (CPU) 201 controls the information processing apparatus 101. A random access memory (RAM) 202 functions as, for example, a work area of the CPU 201.

A storage unit 203 includes, for example, a hard disk drive (HDD) and a floppy disk. The storage unit 203 stores various programs to be executed by the CPU 201, and various kinds of data to be used in processing to be executed by the CPU 201, The CPU 201, the RAM 202, and the storage unit 203 function as a controller. Specifically, the program stored in the storage unit 203 is loaded to the RAM 202, and the CPU 201 executes the program loaded to the RAM 202.

A display unit 204 includes a display such as a cathode ray tube (CRT) display or a liquid crystal display. The display unit 204 displays various kinds of information (e.g. a message) to notify a user of the information.

An operation unit 205 includes, for example, a mouse and a keyboard to receive an input to the information processing apparatus 101 from a user.

A network interface card (NIC) 206 is used so that the information processing apparatus 101 and other network devices mutually exchange data via a local area network (LAN) 207. These devices are mutually connected via a main bus 208.

Figure 3:
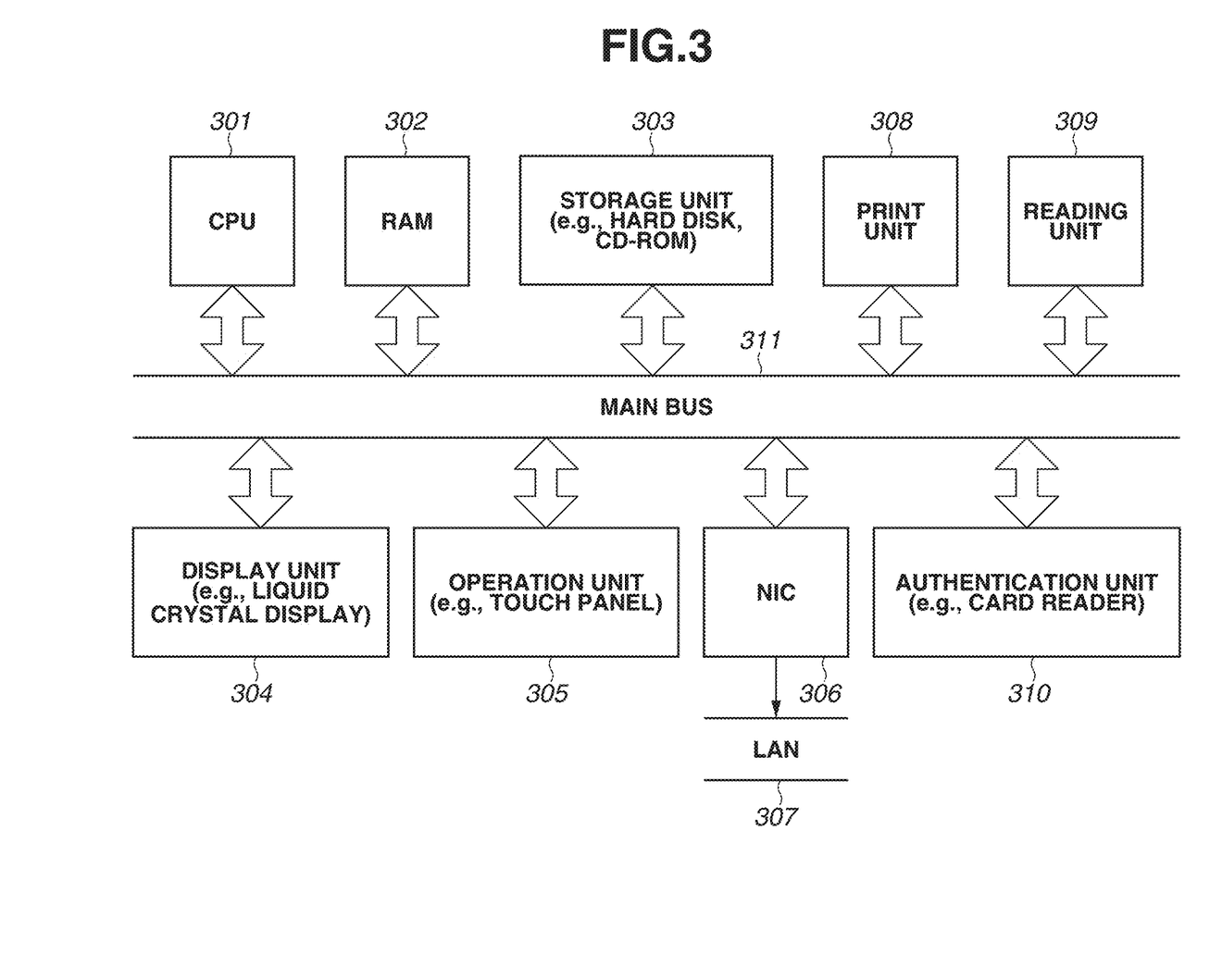
FIG. 3 is a diagram illustrating one example of a hardware configuration of an image forming apparatus.

FIG. 3 is a diagram illustrating one example of a hardware configuration of the image forming apparatus 102.

A CPU 301 controls the image forming apparatus 102. A RAM 302 functions as, for example, a main memory and a work area of the CPU 301.

A storage unit 303 includes, for example, a HDD and a floppy disk. The storage unit 303 stores programs and data such as an application program, font data, and form data. Moreover, the storage unit 303 is used as a job storage area so that a print job is temporarily held, and the held job is externally controlled.

A display unit 304 includes, for example, a liquid crystal display. The display unit 304 displays various kinds of information (e.g., an error message) to notify a user of the information.

An operation unit 305 includes, for example, a hardware key to receive an input from a user to the image forming apparatus 102. The display unit 304 and the operation unit 305 have been described as separate members, but are not limited thereto. The display unit 304 may be a touch panel, and the operation unit 305 may be software keys to be displayed on the touch panel. Alternatively, the operation unit 305 may serve as both software keys and hardware keys.

An NIC 306 is used so that the image forming apparatus 102 and other devices mutually exchange data via a LAN 307.

A print unit 308 (a printer) prints image data on a sheet. Examples of the image data to be printed include image data converted by a print processing unit 504 (described below) from PDL data received from the information processing apparatus 101, and image data generated by a reading unit 309 (described below). The print unit 308 is connected to the CPU 301 by a print interface (I/F) that is not illustrated. The CPU 301 controls the print unit 308 via the print I/F.

The reading unit 309 (a scanner) reads an original document to generate monochrome binary image data or color multivalued image data. The reading unit 309 is connected to the CPU 301 by a reading I/F that is not illustrated. The CPU 301 controls an image signal to be input from the reading unit 309 via the reading I/F.

An authentication unit 310 performs log-in authentication (card authentication) by reading a card that identifies a user, or performs log-in authentication (keyboard input authentication) based on input information that has been input using the operation unit 305.

The CPU 301 controls access to various devices via a main bus 311.

Figure 4:
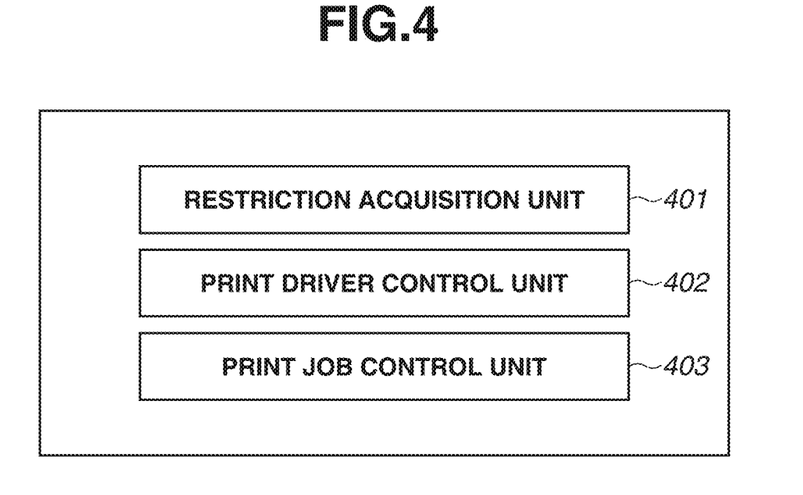
FIG. 4 is a diagram illustrating one example of a functional configuration of the information processing apparatus.

FIG. 4 is a diagram illustrating one example of a functional configuration of the information processing apparatus 101.

A function of the information processing apparatus 101 is controlled by the controller which has been described with reference to FIG. 2.

A restriction acquisition unit 401 requests information about a function restriction setting from the image forming apparatus 102, and stores the acquired function restriction setting information in the RAM 202.

A print driver control unit 402 controls display of a print driver based on the function restriction setting information which has been stored in the RAM 202 by the restriction acquisition unit 401.

A print job control unit 403 transmits a print job to the image forming apparatus 102 in response to a print instruction from a user. In the present exemplary embodiment, the function restriction setting information about the image forming apparatus 102 is acquired. However, function restriction setting information associated with a login user or a group to which a login user belongs may be acquired.

Figure 5:
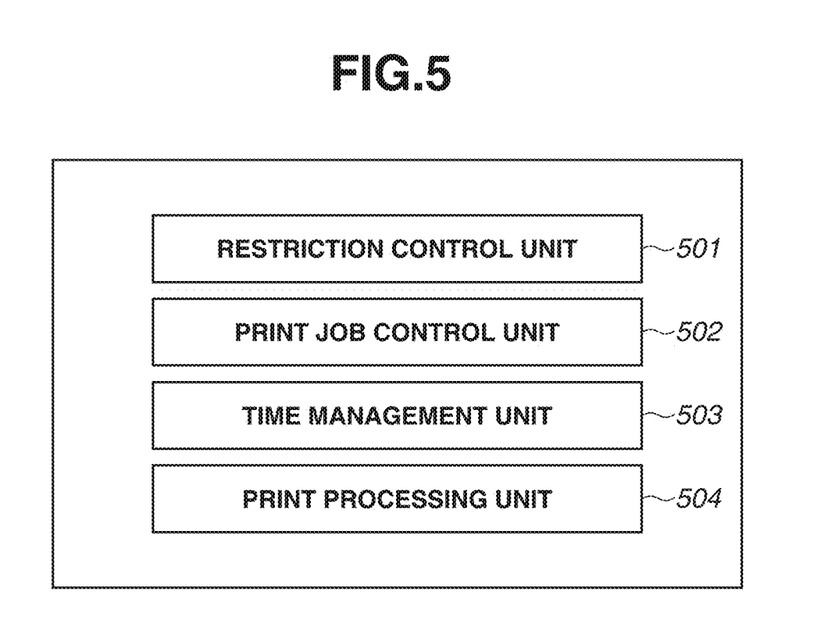
FIG. 5 is a diagram illustrating one example of a functional configuration of the image forming apparatus.

FIG. 5 is a diagram illustrating one example of a functional configuration of the image forming apparatus 102. The image forming apparatus 102 in FIG. 3 has a functional configuration that is controlled by the controller which has been described with reference to FIG. 3.

Figure 8:
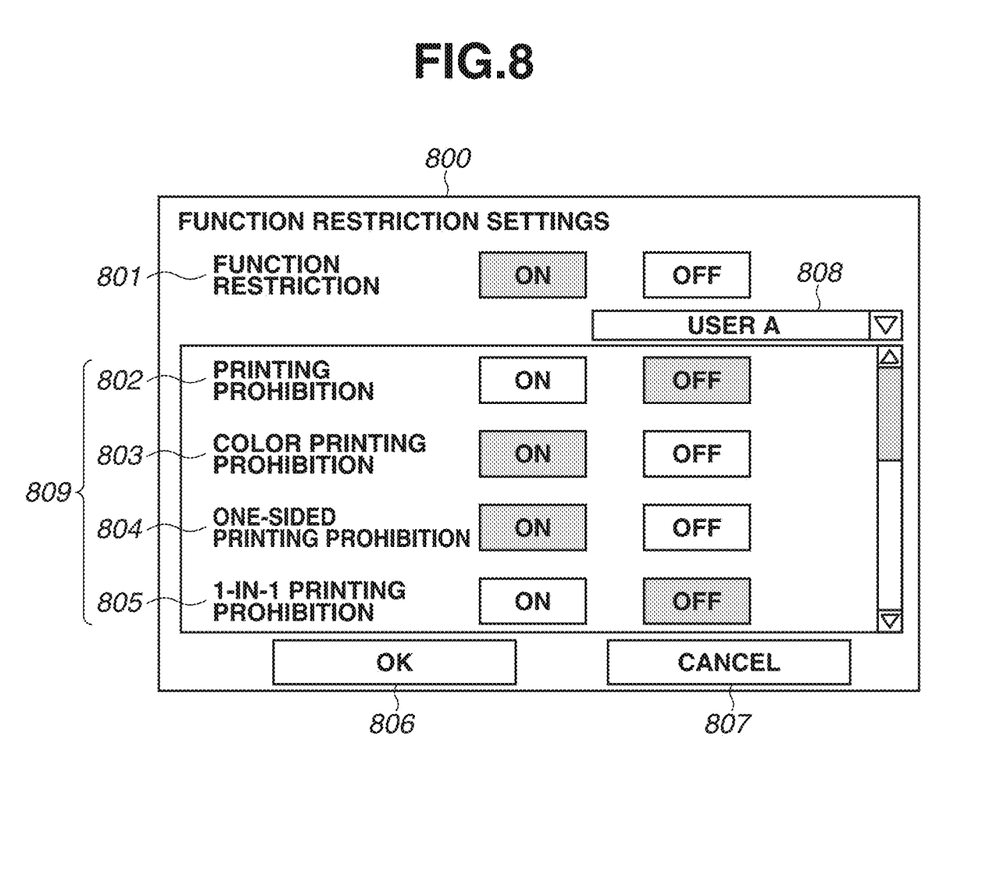
FIG. 8 is a diagram illustrating one example of a function restriction setting screen of the image forming apparatus.

A restriction control unit 501 performs control such that information that has been set on a function restriction setting screen 800 in FIG. 8 is stored in the storage unit 303.

A print job control unit 502 receives a print job transmitted by the information processing apparatus 101. If the print job received from the information processing apparatus 101 does not include print time reserved setting data, the print job control unit 502 stores the print job in the storage unit 303 as a normal print job. If the print job received from the information processing apparatus 101 includes print time reserved setting data, the print job control unit 502 stores the print job in the storage unit 303 as a reserved print job. Moreover, the print job control unit 502 cancels a received print job.

Moreover, after storing the reserved print job in the storage unit 303, the print job control unit 502 receives information about the reserved print job the reserved time of which has been reached, from a time management unit 503. Upon receipt of the information, the print job control unit 502 performs control such that the print processing unit 504 processes the reserved print job the reserved time of which has been reached.

The print job control unit 502 can cause a normal print job to be retained in the storage unit 303 to perform control based on a print instruction received from a user at optional timing, The time management unit 503 compares a time that is held by the image forming apparatus 102 with a reserved time set in a reserved print job, and performs control such that the print job control unit 502 can be notified of information about the reserved print job the reserved time of which has been reached in the image forming apparatus 102.

The print processing unit 504 interprets PDL data of the print job and PDL data of the reserved print job, and outputs the interpreted data to the print unit 308 as bitmap image data. Moreover, the print processing unit 504 identifies a state of a paper feed option (e.g., a feed cassette) or a state of a paper discharge option (e.g., a finisher device) regarding print processing to notify the print unit 308 of the identified state.

Figure 6:
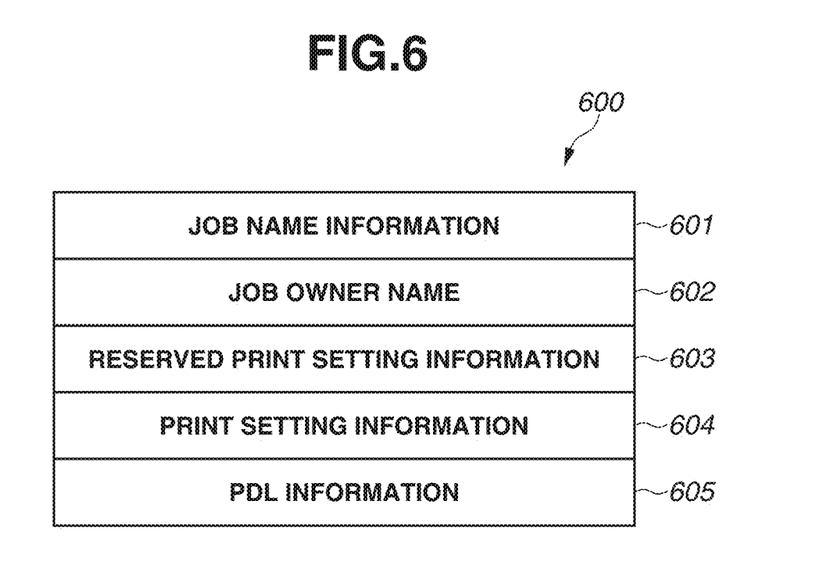
FIG. 6 is a diagram illustrating one example of a print job to be generated by the information processing apparatus.

FIG. 6 is a diagram illustrating one example of a print job 600 to be generated by the information processing apparatus 101.

The print job 600 is generated by a print driver of the information processing apparatus 101. The print job 600 includes job name information 601, a job owner name 602, reserved print setting information 603, print setting information 604, and PDL information 605.

The job name information 601 is a name of the generated print job.

The job owner name 602 is information about a user who has transmitted the print job from the information processing apparatus 101.

The reserved print setting information 603 is print time data indicating a time at which reservation printing set by the user is to be executed. If the print job is not a reserved print job, there is no setting in the reserved print setting information 603.

The print setting information 604 is information about a print setting with respect to the print job. Specifically, the print setting information 604 includes setting information such as a setting of the number of copies of job, a sheet setting, a color/monochrome setting, an aggregation setting, and a one-sided/two-sided setting.

The PDL information 605 indicates PDL data, and represents a language for creation of bitmap data.

Next, a configuration for controlling a print driver of the information processing apparatus 101 based on a function restriction setting of the image forming apparatus 102 is described with reference to FIGS. 7A and 7B.

Figure 7A:
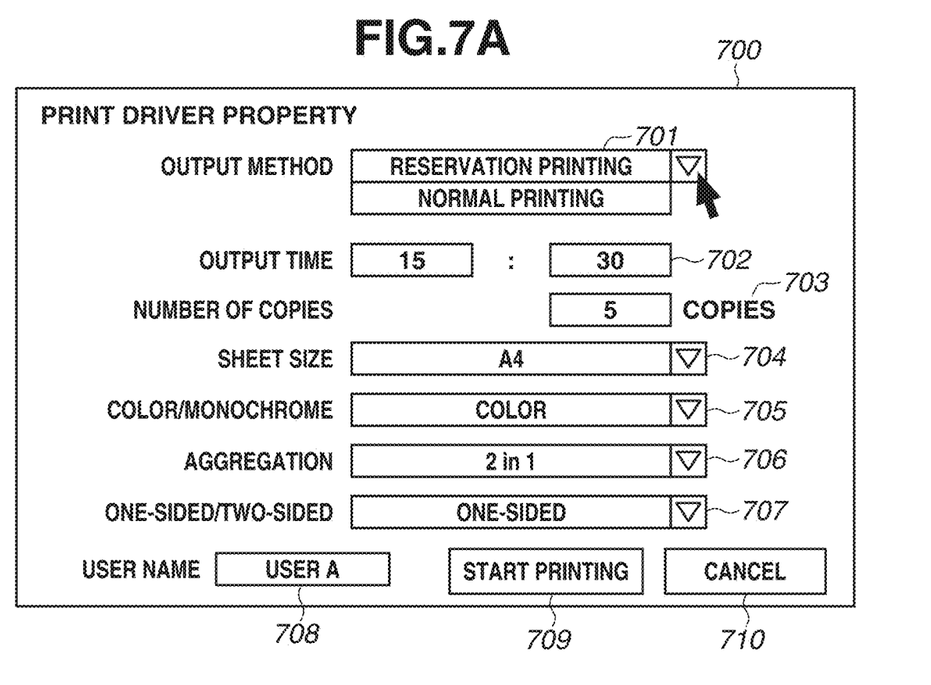
FIGS. 7A, 7B, and 7C are diagrams each illustrating one example of a property screen of a print driver that operates in the information processing apparatus.
Figure 7B:
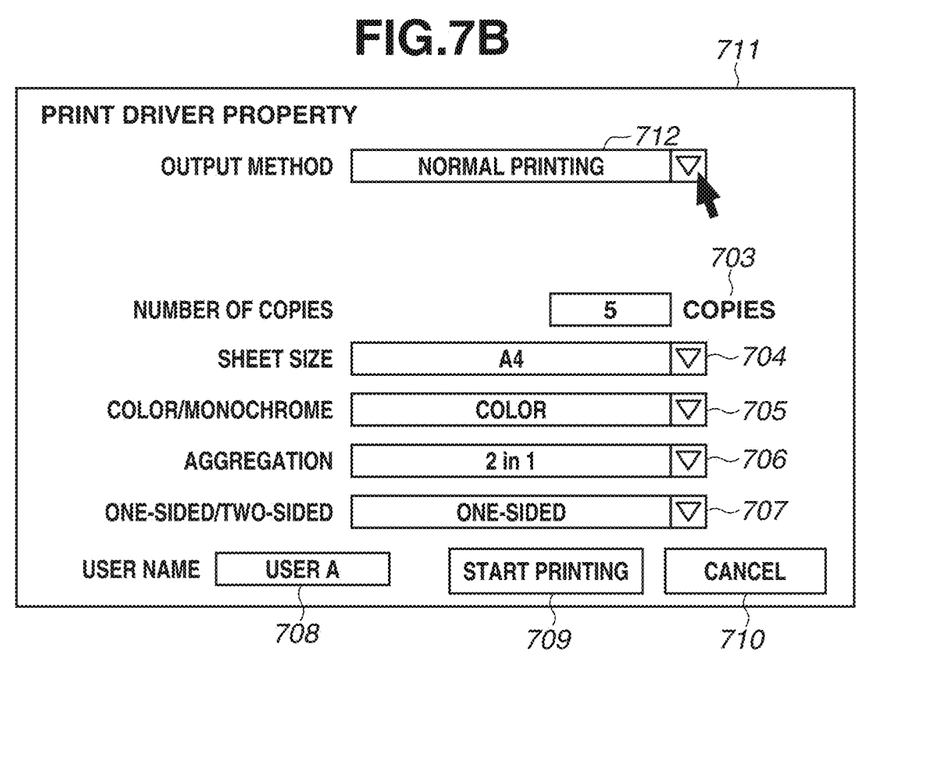

FIG. 7A illustrates a property screen 700 on which reservation printing is selectable in an output method, whereas FIG. 7B illustrates a property screen 711 on which reservation printing is not selectable in an output method.

Hereinafter, the property screen 700 in FIG. 7A is described. In FIG. 7B, the same reference numerals as FIG. 7A are given to functions similar to those in FIG. 7A and detailed description thereof is omitted.

FIG. 7A is a diagram illustrating one example of a property screen of a print driver that operates in the information processing apparatus 101. The property screen 700 of the print driver is a screen on which a user can make settings of an output method 701, an output time (hereinafter referred to as a reserved time) 702, the number of copies 703, a sheet size 704, color/monochrome 705, aggregation 706, and one-sided/two-sided 707.

In the output method 701, as illustrated in FIG. 7A, an output method of either reservation printing or normal printing can be selected.

The reserved time 702 is used to designate a print start time of the reserved print job. In the example illustrated in FIG. 7A, an hour and a minute can be designated. However, a configuration in which a user can also designate a year, a month, and a day may be employed. In FIG. 7A, the reserved time 702 is displayed only if reservation printing is selected in the output method 701.

In the configuration illustrated in FIG. 7A, the reserved time 702 is displayed only if reservation printing is selected in the output method 701. However, the configuration is not limited thereto. For example, if normal printing is selected as the output method 701, the reserved time 702 may be displayed in a hatched manner in a state in which the user cannot set a reserved time.

A user name 708 is stored as a job owner name 602 of the print job 600. In the number of copies 703, the number of printing copies can be set. In the sheet size 704, a size (e.g., A4, A3, and B4) of a sheet as a print medium on which image data is to be printed can be selected. In the color/monochrome 705, monochrome printing or color printing can be selected. In the aggregation 706, a setting (e.g., 1 in 1 and 2 in 1) of page aggregation can be selected. In the one-sided/two-sided 707, one-sided printing or two-sided printing can be selected.

If a print start key 709 is selected by the user, the print job 600 is transmitted from the information processing apparatus 101 to the image forming apparatus 102. Here, the setting information which has been input in the reserved time 702 is set in the reserved print setting information 603, whereas the setting information which has been input in each of the number of copies 703, the sheet size 704, the color/monochrome 705, the aggregation 706, and the one-sided/two-sided 707 is set in the print setting information 604.

The print start key 709 may be pressed in a state in which a setting is not made in each of the reserved time 702 through the one-sided/two-sided 707. In such a case, a print job is transmitted in a state in which the reserved print setting information 603 and the print setting information 604 are empty, i.e., there is no setting in the reserved print setting information 603 and the print setting information 604. Moreover, a print job that includes the reserved time 702 in the reserved print setting information 603 is a reserved print job, whereas a print job that does not include the reserved time 702 in the reserved print setting information 603 is a normal print job.

If the user presses a cancel key 710, each setting is cancelled and the print driver property is closed.

The property screen 711 can be configured as a screen separate from the property screen 700, or as a screen that is formed if reservation printing in the output method 701 on the property screen 700 is not selectable.

FIG. 8 is a diagram illustrating one example of a function restriction setting screen of the image forming apparatus 102.

A setting screen 800 is used so that a function restriction for prohibiting the use of advanced settings 809 relating to print functions of the image forming apparatus 102 is set. The setting screen 800 can be displayed by a transition from a management screen (not illustrated) of the image forming apparatus 102. A setting of the setting screen 800 can be made by a user who has an administrator authority.

The setting screen 800 enables validity (ON) or invalidity (OFF) of a function restriction with respect to the image forming apparatus 102 to be set by using a function restriction setting 801. The setting of the function restriction setting 801 is set in the image forming apparatus 102, and such a setting is shared by users who use the image forming apparatus 102.

If the function restriction setting 801 is valid, the use of the advanced settings 809 relating to print functions is prohibited. Moreover, the advanced settings 809 include a printing prohibition setting 802 and a setting (a partial function prohibition setting) relating to a plurality of print functions. For example, the partial function prohibition setting includes a color printing prohibition setting 803, a one-sided printing prohibition setting 804, and a 1-in-1 printing prohibition setting 805.

The printing prohibition setting 802 is used to prohibit printing. The color printing prohibition setting 803 is used to prohibit color printing. The one-sided printing prohibition setting 804 is used to prohibit one-sided printing. The 1-in-1 printing prohibition setting 805 is used to prohibit printing of only one page on one sheet (1 in 1).

If the printing prohibition setting 802 is valid, the color printing prohibition setting 803, the one-sided printing prohibition setting 804, and the 1-in-1 printing prohibition setting 805 are prohibited accordingly. Thus, the settings 803, 804, and 805 can be hidden.

A user selection tab 808 is used to select a user. Selection of a user enables the advanced settings 809 applied if the function restriction setting 801 is valid to be stored in association with the selected user.

If an OK key 806 is pressed by a user, the restriction control unit 501 causes the function restriction setting 801 and setting information in the advanced settings 809 corresponding to the user to be stored as function restriction information 810 in the storage unit 303. If a cancel key 807 is pressed by the user, each of the selected settings is discarded, and the screen returns to the previous screen.

If the function restriction setting 801 is invalid, each print function can be used regardless of the settings in the advanced settings 809 relating to the print functions.

In FIG. 8, the function restriction setting 801 is set to prohibit the use of a setting relating to a print function of the image forming apparatus 102. However, the configuration is not limited thereto. In addition to the prohibition of the use of the setting relating to the print function of the image forming apparatus 102, the function restriction setting 801 can be set to prohibit the use of settings relating to other functions of the image forming apparatus 102. Specifically, the function restriction setting 801 can be configured to prohibit, for example, the use of not only a setting relating to a print function but also advanced settings relating to a function such as a SEND function. In such a case, the advanced settings 809 include a prohibition setting relating to the SEND function.

Figure 9:
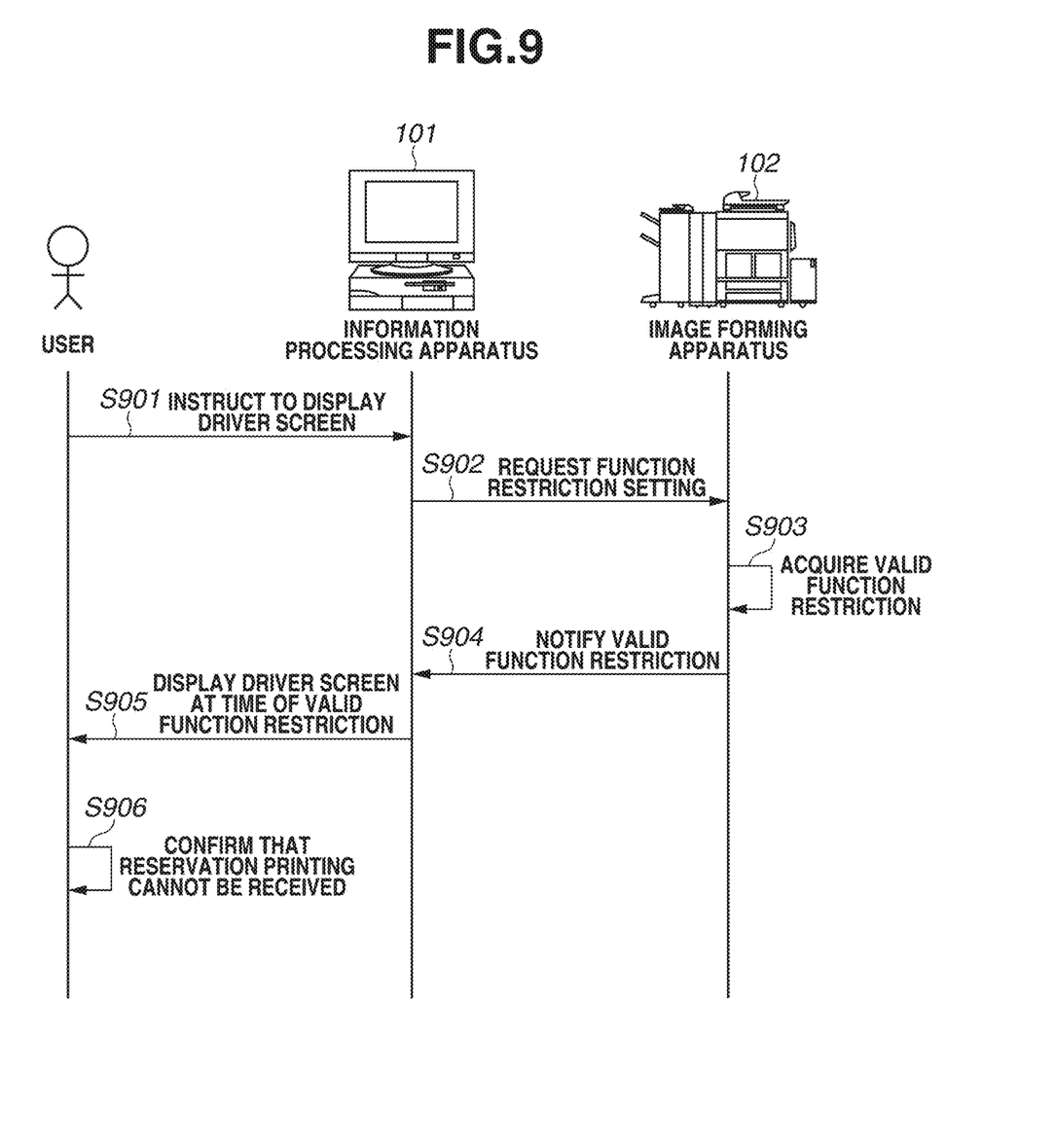
FIG. 9 is a sequence diagram of processing performed by a user, the information processing apparatus, and the image forming apparatus.

Next, communication and processing among a user, the image forming apparatus 102, and the information processing apparatus 101 according to the present exemplary embodiment will be briefly described with reference to a sequence diagram illustrated in FIG. 9.

In step S901, a user instructs the information processing apparatus 101 to display a driver screen.

In step S902, the information processing apparatus 101 requests setting information about whether a function restriction setting is valid or invalid, from the image forming apparatus 102.

In step S903, upon receipt of the request from the information processing apparatus 101, the image forming apparatus 102 stores setting information in RAM 302. Here, the setting information about the function restriction setting which has been set to be valid by the user by using the function restriction setting screen 800 is stored.

In step S904, the image forming apparatus 102 transmits the setting information about the function restriction setting stored in the RAM 302 in step S903 to the information processing apparatus 101.

In step S905, the information processing apparatus 101 checks whether the function restriction setting is valid or invalid in the setting information about the function restriction setting acquired from the image forming apparatus 102. If the function restriction setting is invalid, the information processing apparatus 101 displays the property screen 700 in FIG. 7A. On the other hand, if the function restriction setting is valid, the information processing apparatus 101 displays the property screen 711 in FIG. 7B. Hereinafter, a case will be described where the function restriction setting is valid.

In step S906, the user confirms the property screen 711 of the print driver. On the property screen 711 of the print driver, reservation printing cannot be selected as an output method 712, and a setting of an output time cannot be displayed. Consequently, the user cannot perform reservation printing.

Figure 7C:
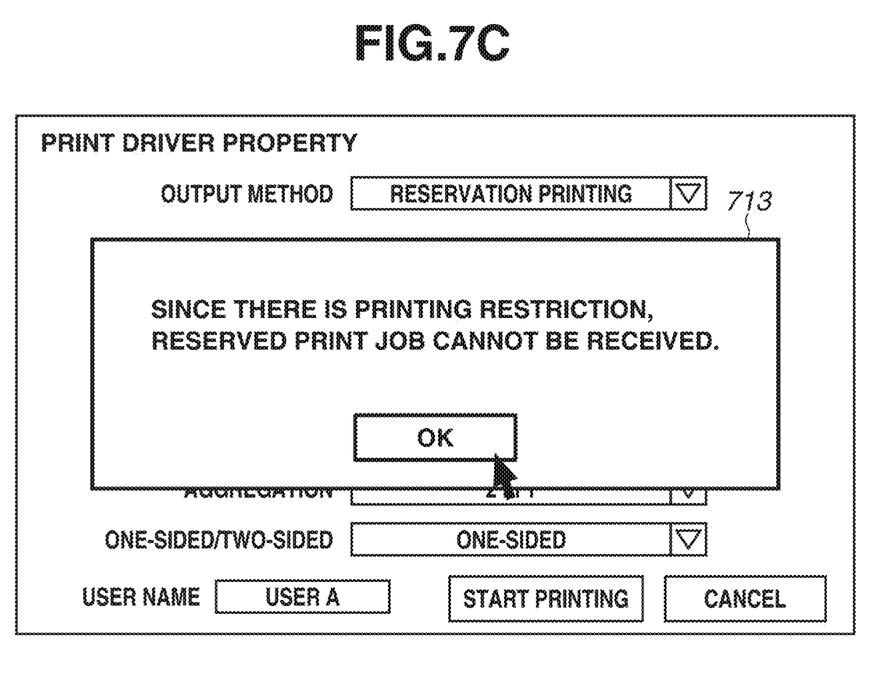

However, even if the function restriction setting is valid, the information processing apparatus 101 may display the property screen 700 in FIG. 7A. In such a case, the user can select reservation printing in the output method 701 and then select a print start key so that the information processing apparatus 101 can display a screen 713 indicating that reservation printing is not executable as illustrated in FIG. 7C. Here, the screen notifying the user of a message that a reserved print job cannot be received is displayed. However, another screen can be displayed as long as a warning screen that gives a warning to the user is displayed.

Figure 10:
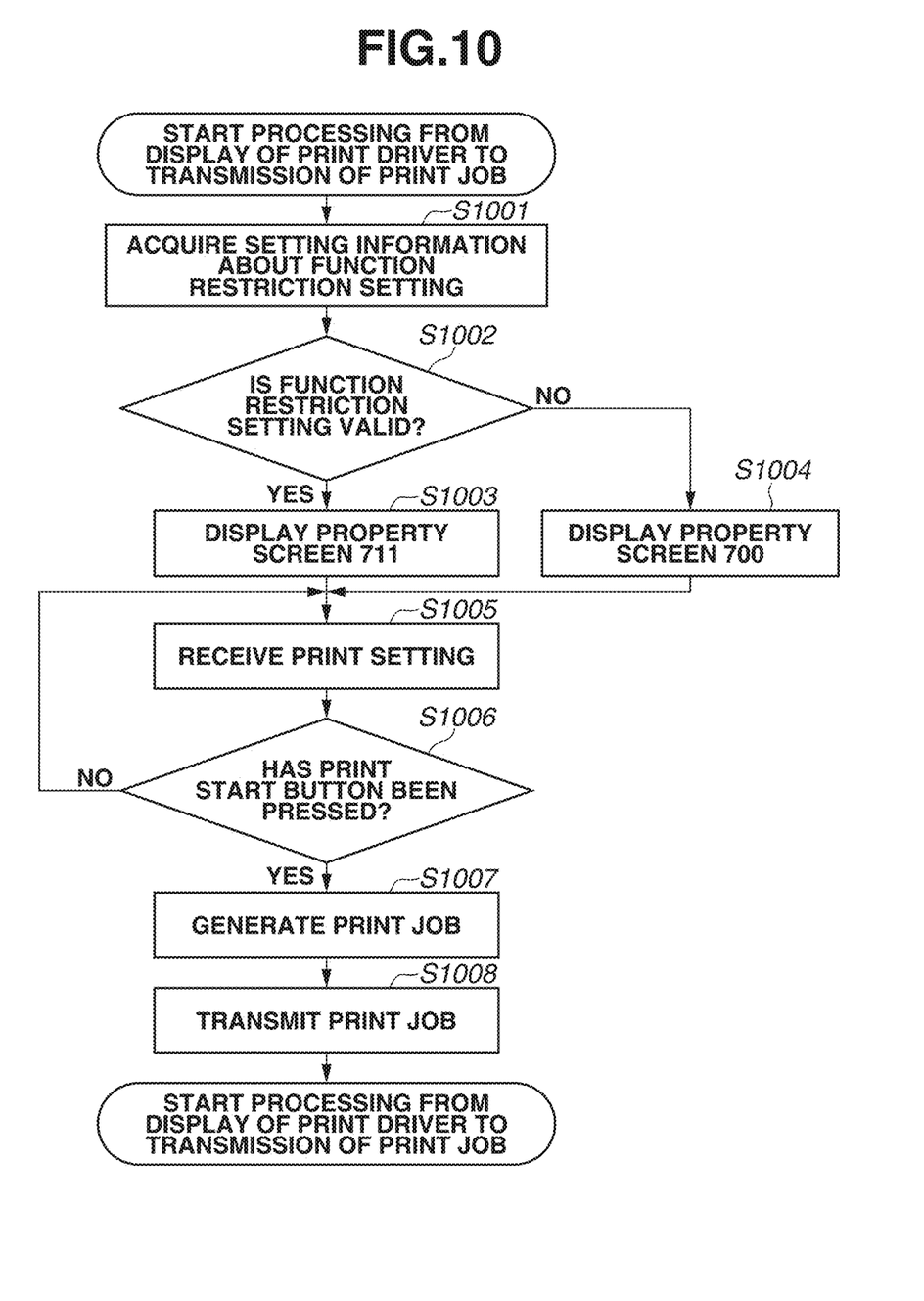
FIG. 10 is a flowchart illustrating processing from display of the print driver to transmission of a print job by the information processing apparatus.

FIG. 10 illustrates a flowchart of processing from display of a print driver to transmission of a print job to the image forming apparatus 102. The processing in FIG. 10 is performed by the information processing apparatus 101.

A program for executing the processing of the flowchart illustrated in FIG. 10 is stored in the RAM 202 or the storage unit 203 in FIG. 2. The program is loaded to the RAM 202 and then executed by the CPU 201.

In step S1001, the restriction acquisition unit 401 requests setting information about a function restriction setting from the image forming apparatus 102, and stores in the RAM 202 the setting information about the function restriction setting acquired from the image forming apparatus 102.

In step S1002, the print driver control unit 402 checks whether a function restriction setting 801 in the setting information stored in the RAM 202 in step S1001 is valid or invalid.

If the function restriction sating 801 is valid (YES in step S1002), the processing proceeds to step S1003. If the function restriction setting 801 is invalid (NO in step S1002), the processing proceeds to step S1004.

In step S1003, the print driver control unit 402 displays the property screen 711 at the display unit 204. Here, the print driver control unit 402 causes reservation printing in the output method 701 on the property screen 700 to be unselectable, thereby forming the property screen 711.

In step S1004, the information processing apparatus 101 displays the property screen 700 at the display unit 204.

In step S1005, the print driver control unit 402 receives a print setting which has been put by a user via the property screen displayed at the display unit 204.

In step S1006, the print driver control unit 402 checks whether the print start key 709 has been selected by the user. If the print start key 709 has been selected (YES in step S1006), the processing proceeds to step S1007. If the print start key 709 has not been selected (NO in step S1006), the processing returns to step S1005.

In step S1007, the print job control unit 403 generates a print job 600 based on the print setting received from the user, and stores the generated print job 600 in the RAM 202.

In step S1008, the print job control unit 403 transmits the print job 600 stored in the RAM 202 in step S1006 to the image forming apparatus 102 via the NIC 206.

According to such a configuration, if a function restriction setting of the image forming apparatus 102 as a reserved print job transmission destination is valid, control can be performed such that a reserved print job cannot be generated by a print driver of the information processing apparatus 101 as a reserved print job transmission source. Accordingly, a reserved print job that cannot be output due to function restriction can be prevented from being transmitted to the image forming apparatus 102.

Figure 11:
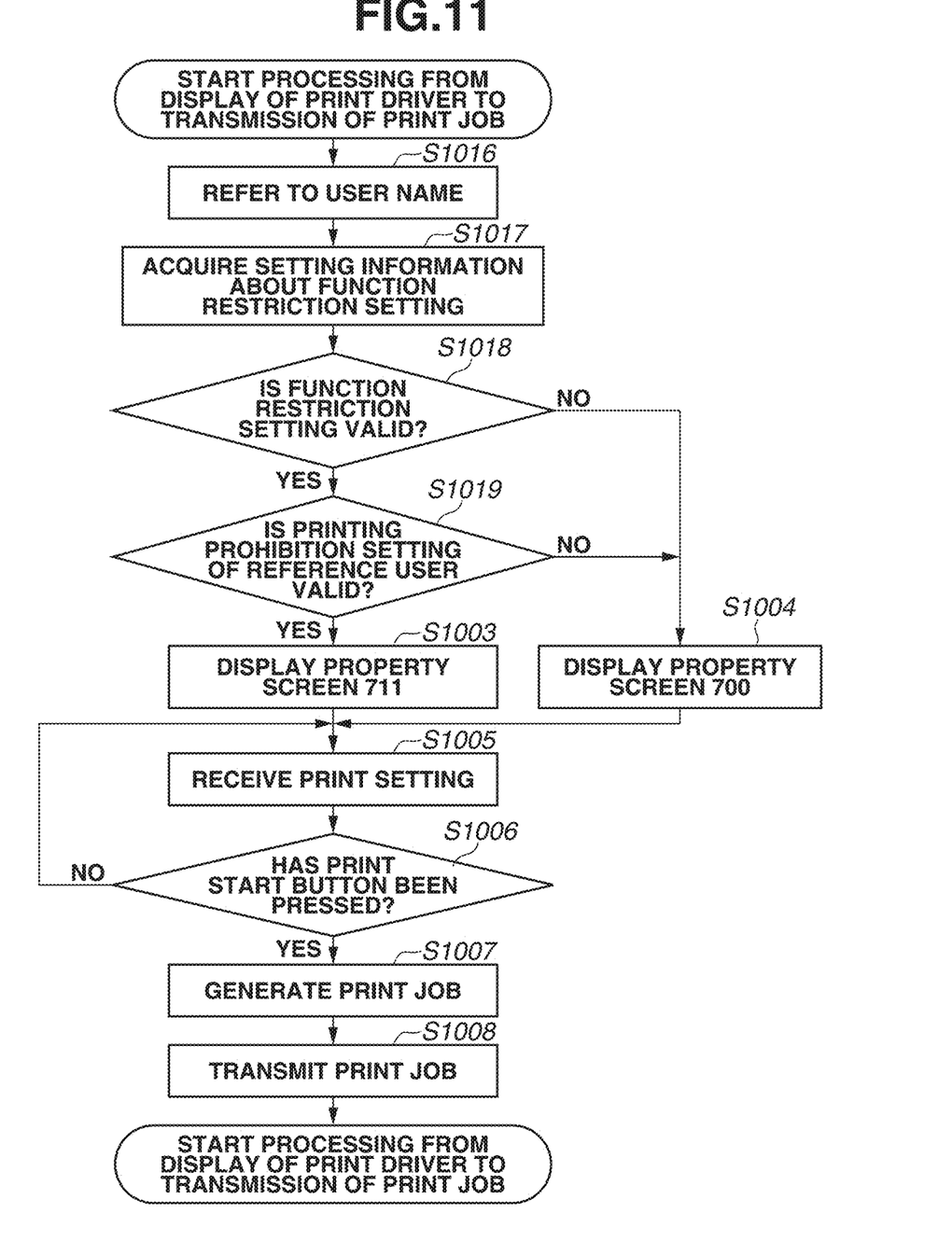
FIG. 11 is a flowchart illustrating processing from display of the print driver to transmission of a print job by the information processing apparatus.

FIG. 11 illustrates a flowchart of processing from display of a print driver to transmission of a print job to an image forming apparatus 102 according to a second exemplary embodiment.

The first exemplary embodiment has been described using a configuration in which a property screen on which reservation printing is not selectable as an output method is displayed if a function restriction setting 801 is valid.

The present exemplary embodiment differs from the first exemplary embodiment in that a property screen on which reservation printing is not selectable as an output method is displayed if a function restriction setting is valid and a printing prohibition setting included in a print setting corresponding to a job owner name of a reserved print job is valid.

In the present exemplary embodiment, the same reference numerals as above are given to components having functions similar to those described above with reference to FIGS. 1 through 10 and detailed description thereof is omitted.

In step S1016, a print driver control unit 402 stores a user name on a property screen 700 of a print driver in a RAM 202. Subsequently, the processing proceeds to step S1017.

In step S1017, a restriction acquisition unit 401 requests setting information about a function restriction setting of the user name stored in the RAM 202 in step S1016 from the image forming apparatus 102. The setting information about the function restriction setting acquired from the image forming apparatus 102 is stored in the RAM 202. Subsequently, the processing proceeds to step S1018.

In step S1018, the print driver control unit 402 checks whether the function restriction setting is valid based on the setting information about the function restriction setting stored in the RAM 202 in step S1017. If the function restriction setting is invalid (NO in step S1018), the processing proceeds to step S1004 in which the property screen 700 is displayed at a display unit 204. If the function restriction setting is valid (YES in step S1018), the processing proceeds to step S1019.

In step S1019, the print driver control unit 402 checks whether a printing prohibition setting 802 is valid based on the setting information about the function restriction setting stored in the RAM 202 in step S1017. If the printing prohibition setting 802 is invalid (NO in step S1019), the processing proceeds to step S1004 in which the property screen 700 is displayed at the display unit 204. If the printing prohibition setting 802 is valid (YES in step S1019), the processing proceeds to step S1003 in which a property screen 711 is displayed at the display unit 204.

Since processing in each of steps S1005 through S1008 is similar to that of the first exemplary embodiment, description thereof is omitted.

According to the present exemplary embodiment, for example, if a function restriction setting is valid, the property screen 711 is displayed at the display unit 204 with respect to a user A the printing prohibition setting 802 of which is valid, the user A cannot select reservation printing in an output method 712. On the other hand, even if a function restriction setting is valid, the property screen 700 is displayed at the display unit 204 with respect to a user B the printing prohibition setting 802 of which is invalid, the user B can select reservation printing in an output method 701.

According to such a configuration, if a function restriction setting is valid, and a printing prohibition setting with respect to a user is valid, control can be performed such that a reserved print job cannot be generated by a print driver of the information processing apparatus 101 as a reserved print job transmission source. This can prevent the reserved print job that cannot be output due to function restriction from being transmitted to the image forming apparatus 102.

Here, validity or invalidity of a function restriction setting is checked, and then validity or invalidity of the printing prohibition setting 802 is checked. However, validity or invalidity of only the printing prohibition setting 802 can be checked. In such a case, the processing proceeds to step S1019 upon completion of step S1017. Even in such a configuration, control can be performed such that a reserved print job cannot be generated by a print driver of the information processing apparatus 101 as a reserved print job transmission source. This can prevent the reserved print job that cannot be output due to function restriction from being transmitted to the image forming apparatus 102.

According to each of the exemplary embodiments, therefore, if a function restriction setting is made in an image forming apparatus, a reserved print job is not transmitted from an information processing apparatus.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-031227, filed Feb. 23, 2018, which is hereby incorporated by reference herein in its entirety.

What is claimed is:

1. An information processing apparatus comprising, a memory storing instructions related to a printer driver for a printer, and one or more processors executing the instructions to:

acquire, from the printer, information about a restriction setting related to limitation of a print function of the printer for each user;

provide a print setting screen for designating an output method and print settings, wherein, as the output method, one of methods at least including a first print method for setting print start time information and a second print method without setting print start time information can be designated;

if it is determined based on the acquired information that the restriction setting is disabled at the printer, the first print method is designated as the output method via the print setting screen and the print start time information is further designated via the print setting screen by a user, transmit, to the printer, a print job in which the print settings and the print start time information have been set, wherein, at the printer, the print job is started at the time specified by the print start time information set in the print job, and if it is determined based on the acquired information that the restriction setting is enabled at the printer, perform control so that the first print method is not set to a print job.

2. The information processing apparatus according to claim 1, wherein, according to the performed control, the first print method cannot be designated as the output method via the print setting screen and the second print method can be designated as the output method via the print setting screen.

3. The information processing apparatus according to claim 2, wherein, if it is determined based on the acquired information that the restriction setting is disabled at the printer, any one of the first print method and the second print method can be designated via the print setting screen without the controlling.

4. A control method for an information processing apparatus executing a printer driver for a printer, the control method comprising:

acquiring, from the printer, information about a restriction setting related to limitation of a print function of the printer for each user;

providing a print setting screen for designating an output method and print settings, wherein, as the output method, one of methods at least including a first print method for setting print start time information and a second print method without setting print start time information can be designated;

if it is determined based on the acquired information that the restriction setting is disabled at the printer, the first print method is designated as the output method via the print setting screen and the print start time information is further designated via the print setting screen by a user, transmitting, to the printer, a print job in which the print settings and the print start time information have been set, wherein, at the printer, the print job is started at the time specified by the print start time information set in the print job, and if it is determined based on the acquired information that the restriction setting is enabled at the printer, performing control so that the first print method is not set to a print job.

5. A non-transitory computer readable storage medium storing a printer driver for a printer, when executed by one or more processors, cause an information processing apparatus to execute a control method, the control method comprising:

acquiring, from the printer, information about a restriction setting related to limitation of a print function of the printer for each user;

providing a print setting screen for designating an output method and print settings, wherein, as the output method, one of methods at least including a first print method for setting print start time information and a second print method without setting print start time information can be designated;

if it is determined based on the acquired information that the restriction setting is disabled at the printer, the first print method is designated as the output method via the print setting screen and the print start time information is further designated via the print setting screen by a user, transmitting, to the printer, a print job in which the print settings and the print start time information have been set, wherein, at the printer, the print job is started at the time specified by the print start time information set in the print job, and if it is determined based on the acquired information that the restriction setting is enabled at the printer, performing control so that the first print method is not set to a print job.

* * * * *